R. Swift,
Harness Saddle,
Nº 18,996. Patented Dec. 29, 1857.
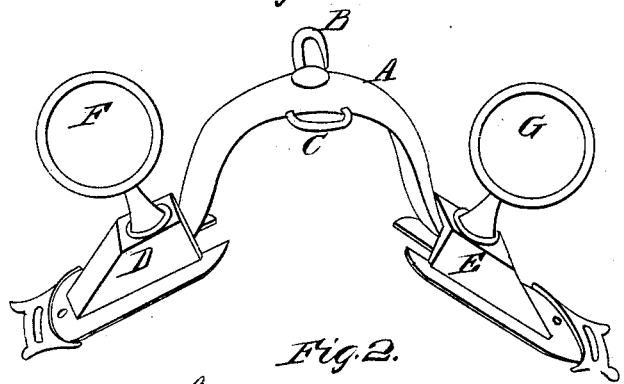
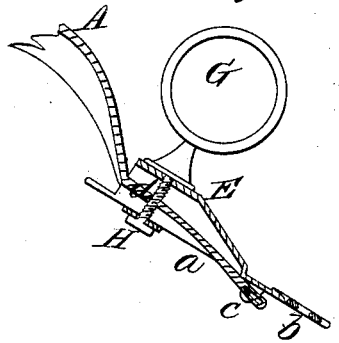

UNITED STATES PATENT OFFICE.

RICHARD SWIFT, OF NEW HAVEN, CONNECTICUT.

HARNESS-SADDLE.

Specification of Letters Patent No. 18,996, dated December 29, 1857.

*To all whom it may concern:*

Be it known that I, RICHARD SWIFT, of the city and county of New Haven, in the State of Connecticut, have invented a new and useful Improvement in Adjustable Harness-Pad Trees; and I do hereby declare that the following is a full, clear, and exact description of the construction and operation of the same, reference being had to the accompanying drawings, which make a part of this specification, in which—

Figure 1 is a perspective view of the yoke, terrets, boxes, &c., of the pad tree. Fig. 2, is a perspective view of a section of the same, showing the inside of the box, the regulating screw, &c., with the arm of the yoke.

My improvement consist in so constructing and arranging the yoke, boxes, and screws as to render the pad readily adjustable to the size and form of the horse's back, simply by turning the terrets which work the screws that pass through the boxes, and the arms, or shanks, of the yoke to adjust the pad.

I make the yoke, A, of any suitable metal, in the form, substantially, as shown in Fig. 1, (with the hook, B, and loop, C, in the ordinary form,) with the arms, or shanks, *a*, Fig. 2, of sufficient length to pass through the boxes, D and E, and with slots in the ends, as shown at *b*, which work freely on joint pins, (as hinges,) as seen at *c*, Fig. 2. I make the boxes, D and E, (also of metal,) hollow, or open, as seen in section in Fig. 2, so that the arms, or shanks, of the yoke may work freely in them to be adjusted. I make the terrets, F and G, of the ordinary form, with male screws passing through female screws in the arms, or shanks, of the yoke, as seen at *d*, Fig. 2, and passing downward through the lower plates of the boxes, I secure them by nuts soldered onto their lower ends, as seen at H, Fig. 2. When this work is attached to the pad, (which is done in the usual way,) it may be adjusted, to spread the pad, (for a large horse,) by turning the terrets so as to raise the yoke in the boxes, or, (for a small horse,) by turning them so as to depress the yoke in the boxes, and thereby be adjusted to fit accurately a horse of any size or form, with the utmost readiness and ease.

What I claim as my invention and desire to secure by Letters Patent, is—

The method of adjusting the pad of the harness by means of the male screws on the terrets, working in the female screws of the arms of the yoke, so as to spread the pad by elevating the arms in the boxes, or contract it by depressing them when the whole is constructed, arranged and made to operate, substantially, as herein described.

RICHD. SWIFT.

Witnesses:
S. RANSOM,
R. FITZGERALD.